United States Patent [19]
Richards et al.

[11] Patent Number: 5,529,085
[45] Date of Patent: Jun. 25, 1996

[54] BREAKAWAY HOSE COUPLING

[75] Inventors: Alton E. Richards; Walter M. Carow, both of Roane County, Tenn.

[73] Assignee: Richards Industries, Rockwood, Tenn.

[21] Appl. No.: 305,028

[22] Filed: Sep. 13, 1994

[51] Int. Cl.[6] .................................................. F16K 17/40
[52] U.S. Cl. .......................................... 137/68.15; 285/2
[58] Field of Search .............................. 137/68.14, 68.15; 285/2, 3

[56]  References Cited

U.S. PATENT DOCUMENTS

| | | | |
|---|---|---|---|
| 3,719,194 | 3/1973 | Anderson et al. | 137/68.15 |
| 3,741,521 | 6/1973 | Tatsuno | 285/2 X |
| 3,788,348 | 1/1974 | Johnson | 137/542 |
| 4,449,545 | 5/1984 | Vernor et al. | 137/68.15 |
| 4,646,773 | 3/1987 | Klop et al. | 137/68.15 |
| 4,691,941 | 9/1987 | Rabushka et al. | 285/1 |
| 4,763,683 | 8/1988 | Carmack | 137/68.15 |
| 4,896,688 | 1/1990 | Richards et al. | 137/68.15 |
| 5,297,574 | 3/1994 | Healy | 137/68.15 |

Primary Examiner—John Rivell
Attorney, Agent, or Firm—Pitts & Brittian

[57]  ABSTRACT

A breakaway hose coupling device (10) for releasably joining two fluid dispensing devices in fluid communications, and for selectively disengaging the dispensing devices in response to a disengaging force in excess of a preselected value being exerted on the coupling device. The coupling device (10) includes first and second valve assemblies (12, 14) for being secured on, and being placed in flow-though communication with dispensing devices and for selectively terminating the flow of fuel from such dispensing device. The first and second valve assemblies including first and second valve housings (16, 18) each having a valve mechanism mounted therein for selectively terminating the flow of fluid through the valve assembly. The device also includes a plurality of shear pins (48A–C) mounted in the second valve housing (18), and at least one stop member (50) carried by the first valve housing (16) for engaging only certain shear pins when the valve housings are engaged in selected relative rotational positions. Accordingly, when certain of the shear pins (48A–C ) are sheared by reason of force in excess of a preselected value being exerted on the coupling, the relative rotational positions of the first and second valve housing can be change to effect the securing of the coupling with certain of the remaining shear pins.

8 Claims, 2 Drawing Sheets

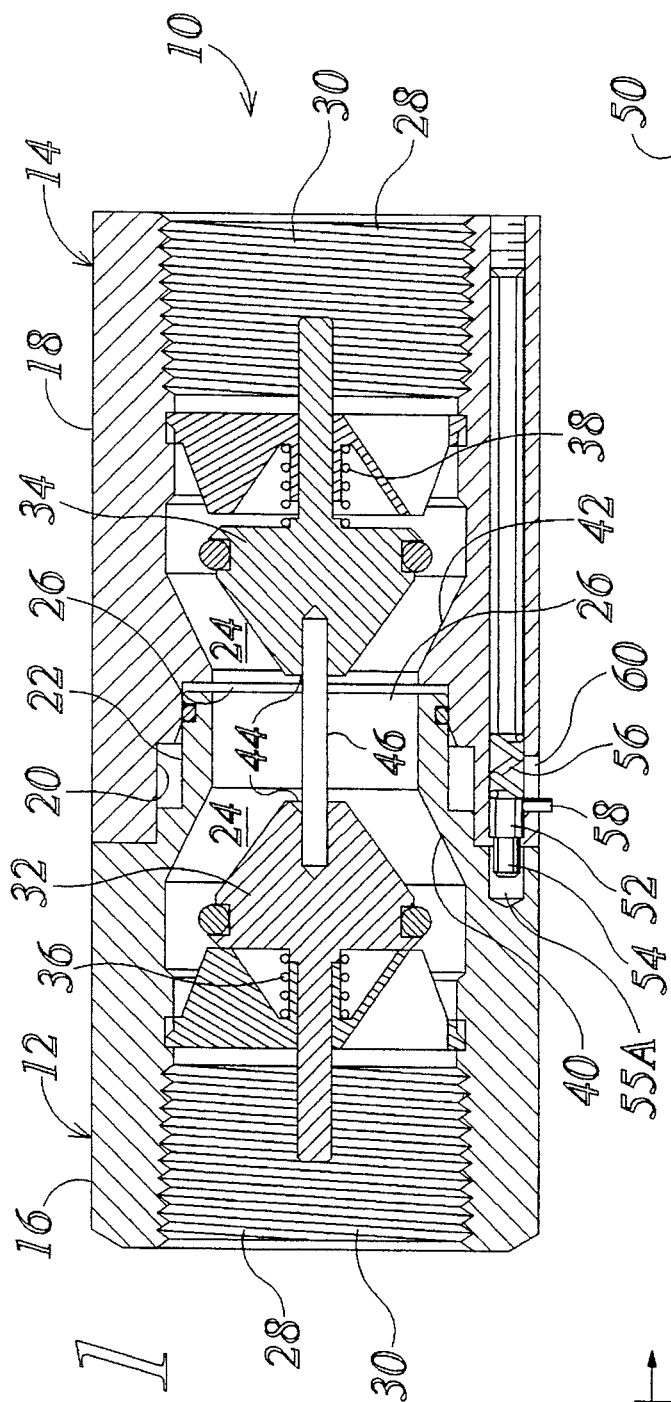
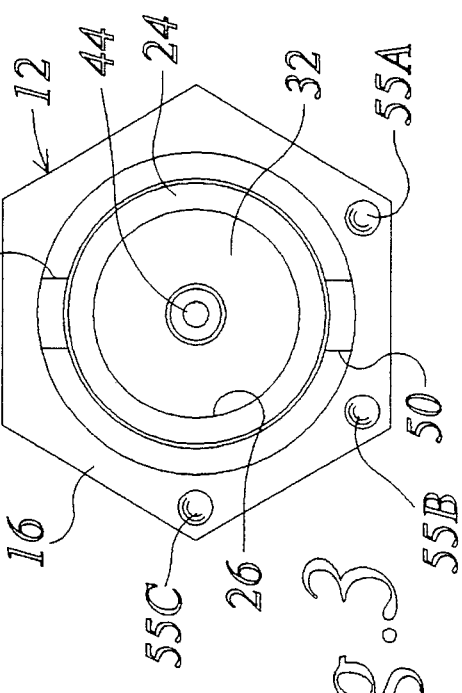
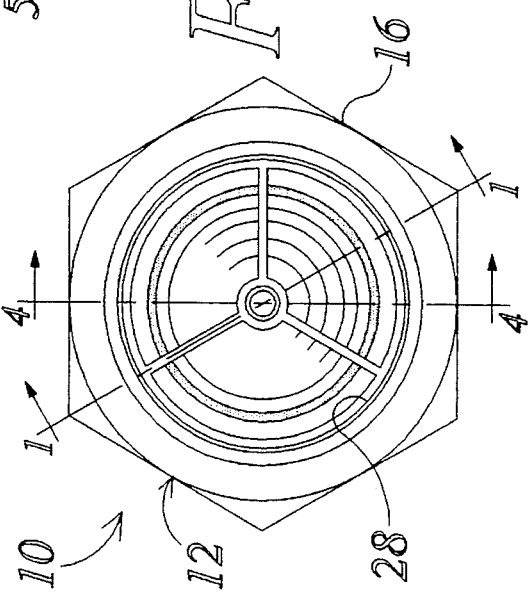

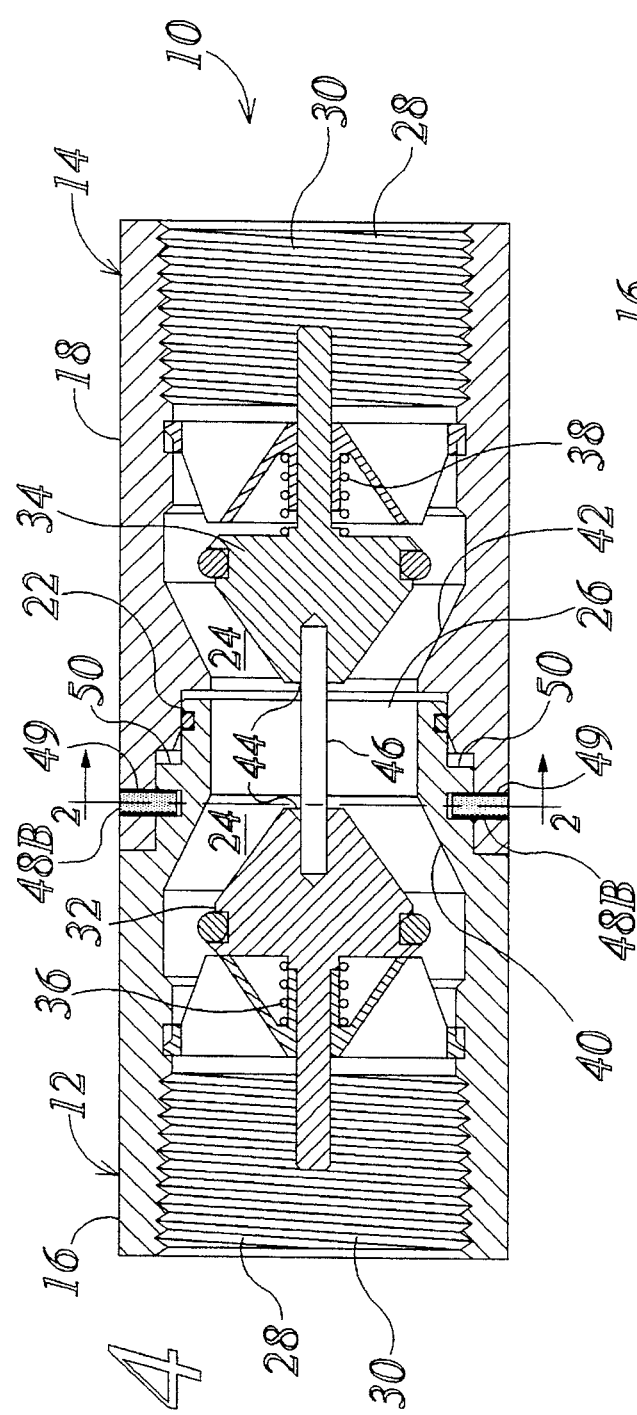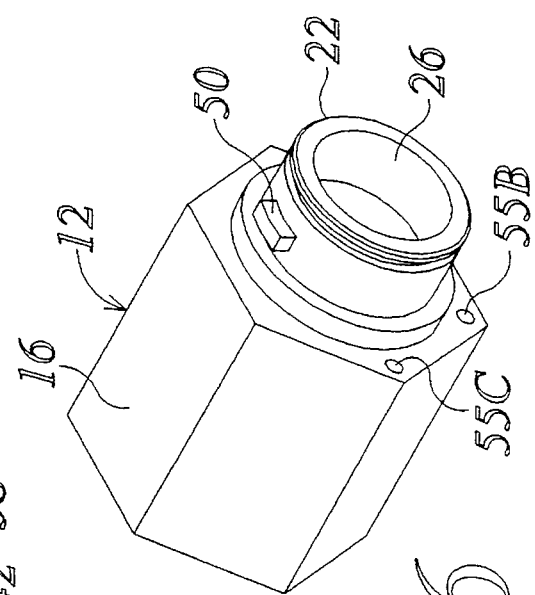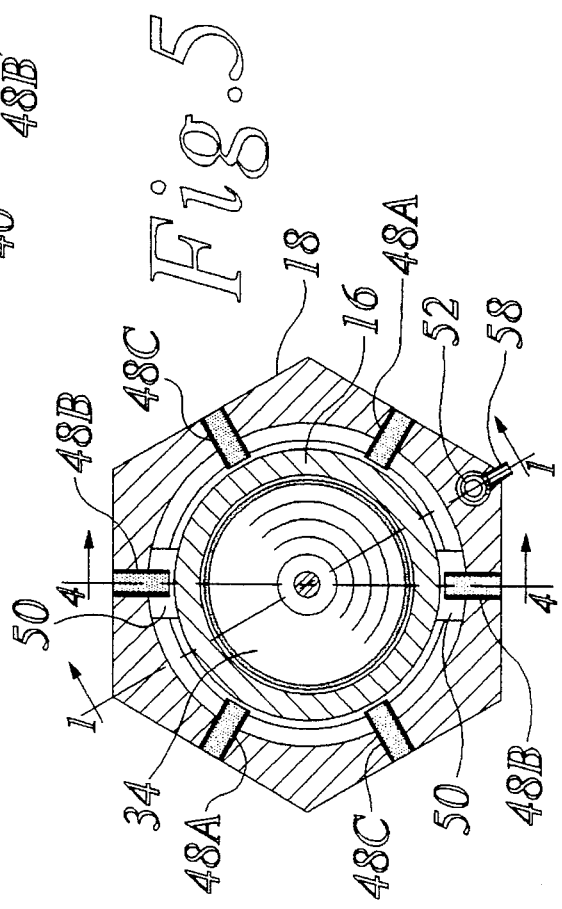

BREAKAWAY HOSE COUPLING

TECHNICAL FIELD

This invention relates to an improved breakaway coupling device for releasably joining two fluid dispensing devices. More specifically, in this particular invention the coupling is designed to disengage and terminate the flow of fluid from the dispensing devices in response to disengaging force in excess of a preselected value being exerted on the coupling device.

BACKGROUND ART

Filing stations for dispensing gasoline and other fuels have long had a problem with vehicles pulling away from the fuel dispensing pump with the dispensing nozzle still inserted in the vehicle's tank, or with the nozzle or dispensing hose otherwise secured or hung on the vehicle. Such incidences usually result in damage to the dispensing pump and/or breakage of the dispensing hose. It will be appreciated that repairing the resulting damage to the dispensing pump and hose can be extremely costly. Further, the fuel spillage which can result from such damage can create a dangerous and possibly life threatening condition. Attempts have been made to overcome this problem by installing two hoses joined by a breakaway coupling device on the dispensing pump, with the coupling device being designed to disengage and seal the hose ends when pressure is exerted on the coupling as in the case where a vehicle pulls away from the pump with the nozzle or hose attached. Many of these device comprise two fluid communicating housings secured to the hose end and which are secured together in fluid communication with shear pins which are designed to shear and disengage the housings in response to force in excess of a preselected value being applied to the coupling. For example, such a device is disclosed in U.S. Pat. No. 4,896,688. Other breakaway coupling devices are disclosed in U.S. Pat. Nos. 4,674,525; 4,646,773; 3,741,521; and 3,719,194. Whereas such devices have proven successful in obviating damage to the operatively associated dispensing pumps and hoses, each time the coupling disengages in response to excessive force being applied, new shear pins must be installed in order to place the coupling back in service. Because of the inconvenience and maintenance costs associated with couplings which rely upon shear pins, much effort has been put into designing couplings which include disconnect mechanisms which allow the coupling to be recoupled without the replacement or repair of components. For example, U.S. Pat. No. 4,691,941, discloses such a coupling. However, such coupling devices tend to be complex and costly.

Therefore, it is an object of the present invention to provide a breakaway hose coupling device for releasably joining two dispensing devices and for selectively disengaging and terminate the flow of fluid from the dispensing devices in response to a disengaging force in excess of a preselected value being exerted on the device.

It is another object of the present invention to provide a breakaway coupling device which utilizes shear pins to effect the automatic disengaging of the coupling, while obviating the need to replace shear pins each time the coupling disengages.

Yet another object of the present invention is to provide a breakaway coupling device which is inexpensive to manufacture and maintain.

DISCLOSURE OF THE INVENTION

Other objects and advantages will be accomplished by the present invention which provides a breakaway hose coupling device for releasably joining two fluid dispensing devices in fluid communications, and for selectively disengaging the dispensing devices in response to a disengaging force in excess of a preselected value being exerted on the coupling device. The coupling device includes first and second valve assemblies for being secured on, and being placed in flow-though communication with, first and second dispensing devices, respectively, and for selectively terminating the flow of fluid from the such dispensing device. The first valve assembly includes a first valve housing having a first valve mechanism mounted therein for selectively terminating the flow of fluid through the first valve assembly and the second valve assembly includes a second valve housing having a second valve mechanism mounted therein for selectively terminating the flow of fluid through the second valve assembly. Further, the second valve housing defines a forwardly disposed receptor which releasably receives the forward portion of the first valve housing when the first and second valve housings are in a coupled position.

The coupling device also includes an automatic disconnect mechanism including a plurality of shear pins mounted in the second valve housing and which extend into the receptor of the second valve housing. The disconnect mechanism further includes one or more stop members carried by the first valve housing. When the first and second valve housings are in an engaged position the stop members engage at least one, but less than all, of the various shear pins such that the shear pins which are engaged serve to maintain the coupled positions of the valve housings in the absence of disengaging force necessary to cause the engaged shear pins to shear off. Accordingly, when the coupling disengages, the shear pins which are engaged by the stop members shear off to release the valve housings, but the other shear pins remain undamaged and available to hold the housings in an engaged position upon recoupling. In this regard, a multi-position locking mechanism is provide for releasably securing the first valve housing in a plurality of discrete rotational position relative to the second valve housing as the first and second valve housings are in an engaged position. In each rotational position the stop members engage only certain of the shear pins, leaving the other shear pins for subsequent use.

BRIEF DESCRIPTION OF THE DRAWINGS

The above mentioned features of the invention will be more clearly understood from the following detailed description of the invention read together with the drawings in which:

FIG. 1 illustrates a side elevation view, in section at 1—1 of FIG. 2, of a breakaway coupling device of the present invention.

FIG. 2 illustrates an end view of a breakaway coupling device of the present invention.

FIG. 3 illustrates a front end view of the first valve assembly of a breakaway coupling device of the present invention.

FIG. 4 illustrates a side elevation view, in section at 4—4 of FIG. 2, of a breakaway coupling device of the present invention.

FIG. 5 illustrates an end view, in section at 2—2 of FIG. 4, of a breakaway coupling device of the present invention.

FIG. 6 illustrates a perspective view of the first valve assembly of a breakaway coupling device of the present invention.

BEST MODE FOR CARRYING OUT THE INVENTION

A breakaway hose coupling device incorporating various features of the present invention is illustrated generally at 10 in the Figures. The coupling device 10 is designed to accomplish the fluid impervious coupling of hose ends (not shown) of two fluid communicating hoses such as the hoses used in association with a fuel dispensing pump, or to accomplish the coupling of a hose end with other fluid dispensing devices (not shown) such as dispensing pumps, nozzles or swivel mechanisms. The coupling 10 is designed to disengage or breakaway upon separation force in excess of a preselected value being applied to the coupling and to seal the disengaged hose ends. Whereas the device 10 will be discussed at times herein in terms of joining fuel dispensing hoses or devices, it will be appreciated that the device can be used to releasably join various types of hoses and dispensing devices for carrying or dispensing various fluids.

The breakaway hose coupling device be 10 includes first and second valve assemblies 12 and 14, respectively. As best illustrated in FIGS. 1 and 4, the first and second valve assemblies 12 and 14 include first and second valve housings 16 and 18, respectively, with the second valve housing 18 defining a forwardly disposed receptor 20 for slidably receiving the forward portion 22 of the valve housing 16. Each of the valve housings 16 and 18 is provided with a passageway 24 therethrough, with each passageway 24 defining a first port 26 and a second port 28 accessing the passageway. The passageways 24 are disposed with respect to the operatively associated valve housing such that, as the forward end portion 22 of the housing 16 is received in the receptor 20, the passageways 24 of the housings 16 and 18 are aligned to establish fluid communication between the housings, with the second ports 28 being provided to effect fluid communication with a hose or dispensing device. In this regard, in the preferred embodiment, the rearward portions of the housings 16 and 18 are provided with threaded receptors 30 to facilitate the removable securing of the housings on hoses or dispensing devices.

In order to automatically seal the passageways 24 when the valve housings 16 and 18 disconnect, each of the valve assemblies 12 and 14 is provided with a valve mechanism disposed within the operatively associated passageway 24. In the preferred embodiment, such valve mechanisms includes the poppet valves 32 and 34 which are axially mounted in the passageways 24 of the housings 16 and 18, respectively. Also provided are the spring members 36 and 38 which serve to bias the poppet valves 32 and 34 toward the valve seats 40 and 42, respectively, defined by the walls of the passageways 24.

Each of the poppet valves 32 and 34 is provided with a forwardly disposed pin receptor 44 which is receptive of an opposite end portion of an actuating pin 46. In this regard, in one embodiment the actuating pin 46 is secured in the receptor 44 of the valve 34, and releasably received in the receptor 44 of valve 32. However, the pin 46 can be releasably received by both valves if desired. As illustrated in FIG. 1, when the valve housings 16 and 18 are in an engaged position the actuating pin 46 serves to hold the poppet valves in an axially aligned, open position against the bias of the spring members 36 and 38. However, when the housings 16 and 18 disengage and separate the pin 46 slides from the receptor 44 of poppet valve 32 allowing the poppet valves 32 and 34 to seat against the valve seats 40 and 42, respectively. As a result, the passageways 24 of the housings 16 and 18 are sealed and the flow of fluid from the hoses or dispensing devices to which the housings are secured is terminated.

The coupling device 10 be also includes a disconnect mechanism which serves to automatically disconnect the housings 16 and 18 when disengaging force in excess of a preselected value is applied to the coupling 10. As best illustrated in FIGS. 4 and 5, in the preferred embodiment this disconnect mechanism includes a plurality of shear pins 48A–C. The shear pins 48A–C are mounted in openings 49 provided in the forward end of the valve housing 18, as by a light press fit, such that, as the shear pins 48A–C are mounted in the openings 49, a distal end portion of each pin 48A–C extends into the receptor 20. Further, the forward portion 22 of the valve housing 16 carries at least one, and preferably two stop members 50.

In this regard, it will be noted that in the preferred illustrated embodiment there are two stop member 50 provided, with the stop members 50 being in oppositely disposed radial positions. Further, the housing 18 accommodates the mounting of six shear pins 48A–C at radially spaced locations. Accordingly, in order to insert and secure the forward portion 22 of the housing 16 in the receptor 20, the housing 26 is rotated to a position where the stop members 50 can be received between the shear pins 48A–C and the forward portion 22 is inserted into the receptor 20. The housing 16 is then rotated until the stop members 50 register with an oppositely disposed pair of shear pins 48A–C, as illustrated in FIGS. 4 and 5, thereby prohibiting withdrawal of the forward portion 22 from the receptor 20 in absence of disengaging force sufficient to shear the pins 48A–C.

In order to releasably secure the relative rotational position of the valve housings 16 and 18 such that the stop members 50 remain in a registering position relative to a pair of shear pins 48A–C, the coupling device 10 includes a multi-position locking mechanism capable of locking the housings 16 and 18 in at least two, and preferably three or more, rotational positions. Whereas various locking mechanisms can be used, in the preferred illustrated embodiment the locking mechanism includes a latch member 52 which is slidably mounted in the valve housing 18 as illustrated in FIG. 1.

The latch member 52 carries a latch pin 54 which is movable between an extended position and a retracted position. When the latch member 52 is moved to its extended position the latch pin 54 extends into one of a plurality of receptors 55A–C, provided in the housing Of course, when the latch pin 54 is positioned in a receptor 55A–C, the relative rotational positions of the housings 16 and 18 are releasably fixed, thus allowing the housings 16 and 18 to be secured together with the stop members 50 and shear pins 48A–C prohibiting relative axial movement, and the latch pin 54 prohibiting relative rotational movement. When the latch pin 54 is in the retracted position the housings 16 and 18 are free to rotate relative to one another to allow the uncoupling of the housings 16 and 18.

In order to avoid inadvertent uncoupling of the housings 16 and 8, in the preferred embodiment a spring 56 is provided for biasing the latch member 52 toward the extended or locked position. Further, to facilitate movement of the latch member 52 to the retracted or unlocked position, the latch member 52 can be provided with a release stem 58 which is received through a slot 60 provided in the housing 18. Accordingly, in order to move the latch member 52 to the retracted or unlocked position the stem 58 is moved rearwardly.

As best illustrated in FIGS. 3, 5 and 6, in the preferred embodiment the housing 16 is provided with three receptors 55A–C, each of which is capable of receiving the latch pin 54 of the latch member 52. In this regard, it will be recognized that the receptors 52A–C are positioned such that when the latch pin 54 is received in the receptor 55A (see FIG. 3) the relative positions of the housings 16 and 18 are such that the stop members 50 register with the shear pins 48A (see FIG. 5). Further, when the latch pin 54 is received in the receptor 55B the stop members 50 register with the shear pins 48B, and when the latch pin 54 is received in the receptor 55C the stop members 50 register with the shear pins 48C.

Because the coupling device 10 is provided with multiple shear pins the device 10 can be reused a number of times, depending upon the number of shear pins originally installed, without the necessity of reinstalling shear pins after each uncoupling. For example, where disengaging force in excess of a preselected value causes the shear pins 48A to shear and the device 10 to uncouple, the device 10 can be recoupled with the latch pin 54 positioned in the receptor 55B, such that the shear pins 48B maintain the housings 16 and 18 in their coupled positions. If disengaging force in excess of a preselected value then causes the pins 48B to be sheared, the pins 48C can then be utilized. It is only after all pairs of shear pins 48A–C have been exhausted that the coupling device 10 requires maintenance to reinstall shear pins.

It will be noted that whereas the device 10 utilizes three pairs of shear pins and a pair of stop members 50, other numbers of shear pins and stop members can be used if desired, and the illustrated device 10 is merely illustrative of one preferred embodiment. Also, it will be recognized that the disconnect mechanism and multi-position locking mechanism of the device 10 can be used with breakaway coupling devices incorporating vapor passageways for communicating fuel vapors therethrough, and with breakaway coupling devices which incorporate as swivel mechanism, such as for example the coupling device of U.S. Pat. No. 5,115,836.

In light of the above it will be appreciated that the present invention provides a breakaway coupling device having great advantages over the prior art. However, while a preferred embodiment has been shown and described, it will be understood that there is no intent to limit the invention to such disclosure, but rather it is intended to cover all modifications and alternate constructions falling within the spirit and scope of the invention as defined in the appended claims.

We claim:

1. A breakaway hose coupling device for releasably joining two fluid dispensing devices in fluid communication, and for selectively disengaging the dispensing devices in response to a disengaging force in excess of a preselected value being exerted on said coupling device, said coupling device comprising:

a first valve assembly for being secured on, and being placed in flow-through communication with, a first dispensing device and for selectively terminating the flow of fuel from the first dispensing device, said first valve assembly including a first valve housing having a first valve mechanism mounted therein for selectively terminating the flow of fluid through said first valve assembly;

a second valve assembly for being secured on, and being placed in flow-though communication with, a second dispensing device and for selectively terminating the flow of fuel from said second dispensing device, said second valve assembly including a second valve housing for releasably engaging said first valve housing thereby establishing fluid communication therebetween, said second valve housing having a second valve mechanism mounted therein for selectively terminating the flow of fluid through said second valve assembly;

an automatic disconnect mechanism including at least first and second shear pins mounted in said second valve housing, and at least one stop member carried by said first valve housing for engaging said first shear pin when said first valve housing is in a first rotational position relative to said second valve housing thereby maintaining the engagement of said first and second valve housings, and for engaging said second shear pin when said first valve housing is in a second rotational position relative to said second valve housing thereby maintaining the engagement of said first and second valve housings; and a multi-position locking mechanism for selectively and releasably securing said first and second valve housings in at least said first and second rotational positions.

2. The coupling device of claim 1 wherein said second valve housing defines a forwardly disposed receptor for closely receiving a forward portion of said first valve housing to accomplish the engagement of said first and second valve housings, and wherein said first and second shear pins define distal end portions which extend into said receptor of said second valve housing so as to be engagable by said stop member of said first valve housing.

3. The coupling device of claim 2 wherein said device is provided with at least a pair of said first shear pins and at least a pair of said second shear pins, and wherein said forward portion of said first valve housing carries at least two said stop members, whereby each of said stop members engages one of said first shear pins when said first and second valve housings are in said first rotational position, and each of said stop members engages one of said second shear pins when said first and second valve housings are in said second rotational position.

4. The coupling device of claim 2 wherein said device is provided with a pair of said first shear pins, a pair of said second shear pins, and a pair of third shear pins, and wherein said forward portion of said first valve housing carries at least two said stop members, whereby each of said stop members engages one of said first shear pins when said first and second valve housings are in said first rotational position, each of said stop members engages one of said second shear pins when said first and second valve housings are in said second rotational position, and each of said stop members engages one of said third shear pins when said first and second valve housings are in a third rotational position.

5. The coupling device of claim 1 wherein said multi-position locking mechanism includes a latch mechanism having a latch pin movable between an extended position and an retracted position, whereby, when in said extended position, said latch pin extends between said first and second valve housings and prohibits rotation of said first valve housing relative to said second valve housing.

6. The coupling device of claim 1 wherein said first valve housing defines at least a first and second pin receptor, and wherein said multi-position locking mechanism includes a latch mechanism mounted in said second valve housing and having a latch pin movable between an extended position and an retracted position, whereby in said extended position said latch pin is selectively received in one of said first and second pin receptors of said first valve housing and whereby said first and second valve housings are in said first rotational position when said latch pin is in said first pin receptor and said first and second valve housings are in said second rotational position when said latch pin is in said second pin receptor.

7. The coupling device of claim 4 wherein said first valve housing defines at least first, second and third pin receptors, and wherein said multi-position locking mechanism includes a latch mechanism mounted in said second valve housing having a latch pin movable between an extended position and an retracted position, whereby in said extended position said latch pin is selectively received in one of said first, second, and third pin receptors of said first valve housing and whereby said first and second valve housings are in said first rotational position when said latch pin is in said first pin receptor, said first and second valve housings are in said second rotational position when said latch pin is in said second pin receptor, and said first and second valve housings are in said third rotational position when said latch pin is in said third pin receptor.

8. A breakaway hose coupling device for releasably joining two fluid dispensing devices in fluid communications, and for selectively disengaging said dispensing devices in response to a disengaging force in excess of a preselected value being exerted on said coupling device, said coupling device comprising:

a first valve assembly for being secured on, and being placed in flow-though communication with, a first dispensing device and for selectively terminating the flow of fuel from said first dispensing device, said first valve assembly including a first valve housing having a first valve mechanism mounted therein for selectively terminating the flow of fluid through said first valve assembly, said first valve housing defining a forward portion;

a second valve assembly for being secured on, and being placed in flow-though communication with, a second dispensing device and for selectively terminating the flow of fuel from said second dispensing device, said second valve assembly including a second valve housing for releasably engaging said first valve housing thereby establishing fluid communication therebetween, said second valve housing having a second valve mechanism mounted therein for selectively terminating the flow of fluid through said second valve assembly, said second valve housing defining a forwardly disposed receptor for closely receiving said forward portion of said first valve housing to accomplish the engagement of said first and second valve housings; and automatic disconnect mechanism including at least first and second shear pins mounted in said second valve housing, each said first and second shear pin defining a distal end portion extending into said receptor of said second valve housing, and including at least one stop member carried by said forward end portion of said first valve housing for engaging said first shear pin when said first valve housing is in a first rotational position relative to said second valve housing, thereby maintaining the engagement of said first and second valve housings, and for engaging said second shear pin when said first valve housing is in a second rotational position relative to said second valve housing, thereby maintaining the engagement of said first and second valve housings; and a multi-position locking mechanism for selectively and releasably securing said first and second valve housings in at least said first and second rotational positions.

\* \* \* \* \*